United States Patent
Qiang

(10) Patent No.: US 8,913,505 B2
(45) Date of Patent: Dec. 16, 2014

(54) PMIPV6 MAG RESTORATION

(71) Applicant: Zu Qiang, Kirkland (CA)

(72) Inventor: Zu Qiang, Kirkland (CA)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 143 days.

(21) Appl. No.: 13/632,826

(22) Filed: Oct. 1, 2012

(65) Prior Publication Data

US 2013/0083670 A1 Apr. 4, 2013

Related U.S. Application Data

(60) Provisional application No. 61/541,698, filed on Sep. 30, 2011.

(51) Int. Cl.
| | |
|---|---|
| *H04W 24/04* | (2009.01) |
| *H04W 8/30* | (2009.01) |
| *H04W 80/04* | (2009.01) |
| *H04L 29/14* | (2006.01) |
| *H04W 8/08* | (2009.01) |

(52) U.S. Cl.
CPC ............. *H04W 8/30* (2013.01); *H04W 80/04* (2013.01); *H04L 69/40* (2013.01); *H04W 24/04* (2013.01); *H04W 8/087* (2013.01)
USPC .......................................... 370/242; 370/241

(58) Field of Classification Search
None
See application file for complete search history.

(56) References Cited

U.S. PATENT DOCUMENTS

2011/0075675 A1* 3/2011 Koodli et al. ................. 370/401

FOREIGN PATENT DOCUMENTS

WO 2009/152861 A1 12/2009

OTHER PUBLICATIONS

Devarapalli et al., Heartbeat Mechanism for Proxy Mobile IPV6, IETF RFC 5847, Jun. 2010.*
Gundavelli et al., Proxy Mobile IPV6, Network Working Group, RFC 5213, Aug. 2008.*
3GPP TS 29.275 V11.0.0, 3rd Generation Partnership Project; Technical Specification Group Core Network and Terminals; Proxy Mobile IPv6 (PMIPv6) based Mobility and Tunnelling protocols; stage 3 (Release 11), Sep. 2011, pp. 1-72.
3GPP TS 23.007 V10.5.0, 3rd Generation Partnership Project; Technical Specification Group Core Network and Terminals; Restoration procedures; (Release 10), Sep. 2011, pp. 1-54.
Hongbin Luo et al., An Approach for Building Scalable Proxy Mobile IPv6 Domains, IEEE Transactions on Network and Service Management, vol. 8, No. 3, Sep. 2011, pp. 176-189.
Xiaoyan Shi et al., Proxy Mobile IPv6 Reliability Protocol, NETLMM WG, Internet Draft, Sep. 5, 2009, pp. 1-43.
PCT Search Report from corresponding application PCT/IB2012/055261.

(Continued)

*Primary Examiner* — Yemane Mesfin
*Assistant Examiner* — Jeff Banthrongsack
(74) *Attorney, Agent, or Firm* — Alex Nicolaescu; Ericsson Canada Inc.

(57) ABSTRACT

A mechanism to permit an LMA to perform some specific handling once MAG restart is detected is disclosed. If a MAG restart is detected by the LMA, the LMA preferably will not release all corresponding binding in its cache. The LMA may select an alternative MAG which is servicing the same. Then the LMA can send a mobility message to the selected MAG. The mobility message can be triggered by the restart detection or by the received downlink data on one or more valid binding. The mobility message can contains all UE identity that has a valid binding in the LMA and the restarted MAG.

13 Claims, 2 Drawing Sheets

(56) References Cited

OTHER PUBLICATIONS

V. Devarapalli et al., Heartbeat Mechanism for Proxy Mobile IPv6, IETF RFC 5847, Jun. 2010, pp. 1-11.

V. Devarapalli et al., Mobile IPv6 Vendor Specific Option, Network Working Group, RFC 5094, Dec. 2007, pp. 1-7.

S. Gundavelli et al., Proxy Mobile IPv6, Network Working Group, RFC 5213, Aug. 2008, pp. 1-92.

R. Wakikawa et al., IPv4 Support for Proxy Mobile IPv6, IETF RFC 5844, May 2010, pp. 1-49.

A. Muhanna et al., Binding Revocation for IPv6 Mobility, IETF RFC 5846, Jun. 2010, pp. 1-39.

* cited by examiner

Figure 1

| Octets | Bits 8 7 6 5 4 3 2 1 |
|---|---|
| 1 | Type |
| 2 | Length |
| 3 | Restoration Notification |
| 4-n | UE1 ID |
| n-m | UE2 ID |
| ... | |
| x-y | UEz ID |

| Octets | Bits 8 7 6 5 4 3 2 1 | |
|---|---|---|
| 1 | Type | |
| 2 | Length | |
| 3 | Vendor Id (1st Octet) | |
| 4 | Vendor Id (2nd Octet) | |
| 5 | Vendor Id (3rd Octet) | |
| 6 | Vendor Id (4th Octet) | |
| 7 | Sub-Type | |
| 8 | Reserved | M |
| 9 | Restoration Notification | |
| 10-n | UE1 ID | |
| n-m | UE2 ID | |
| ... | | |
| x-y | UE z ID | |

102

PMIPV6 MAG RESTORATION

CROSS REFERENCE TO RELATED APPLICATIONS

This application claims the benefit of priority from previously filed U.S. Provisional Patent Application No. 61/541,698 entitled "PMIPv6 MAG Restoration" filed Sep. 30, 2011, the contents of which are expressly incorporated herein by reference.

TECHNICAL FIELD

This disclosure relates generally to handling of mobile IP addressing in addressing systems such as Internet Protocol Version 6 (IPv6).

BACKGROUND

As specified in IETF RFC5847, across Proxy Mobile IPv6 (PMIPv6) interfaces, PMIPv6 entities typically utilize PMIPv6 Heartbeat mechanism for node restart detection.

A network infrastructure based PMIPv6 entity is typically required to maintain two restart counters in volatile memory a remote restart counter of a peer with which the entity is in contact; and in non-volatile memory an own, or local restart counter that was sent to a peer. After a PMIPv6 entity has restarted, it typically immediately increments all local restart counters and clears all remote restart counters. A PMIPv6 entity may have a common local restart counter for all peers, or it may have a separate local restart counter for each peer.

With the above conventional PMIPv6 Restoration solution, once the peer node restart is detected, the PMIPv6 node shall release all its corresponding PMIPv6 bindings in its binding cache.

Once a PMIPv6 node is restarted, the user equipment (UE) in its serving area will experience service interruption. One active UE has to perform initiate attachment procedure again in order to continue with its services.

The problem is on an idle mode UE. One idle mode UE may have service interruption for much longer time, as there is no network signaling to inform the UE that service has been interrupted due to a node restart. The network may have to wait for the UE to perform the periodic location updates procedure in order to inform the UE that there is connection issue. This can be an issue if before the periodic location updates procedure; there is a down link data arrived in the Local Mobility Anchor (LMA).

Therefore, it would be desirable to provide a system and method that obviate or mitigate the above described problems.

SUMMARY

It is an object of the present invention to obviate or mitigate at least one disadvantage of the prior art.

In a first aspect of the present invention, there is provided a method for handling the reset of a first network node, the method carried out at a Local Mobility Anchor responsible for a User Equipment associated with the first network node. The method comprises the steps of detecting a failure of the first network node; determining that the User Equipment is served by the first network node; and transmitting a notification message towards a second network node requesting transmission of a re-attach message to the User Equipment over an access network specific path.

In an embodiment of the first aspect of the present invention, first network node is a Mobility Access Gateway. In another embodiment, the step of detecting the failure includes detecting the restart of the network node and optionally, the first network node and the second network node are the same node. In a further embodiment, the User Equipment is identified in the notification message by an access network specific address such as an International Mobile Subscriber Identity (IMSI) or an Mobile Station International Subscriber Directory Number (MSISDN).

In a further embodiment, the step of determining includes examining a binding associated with the User Equipment to identify that the user equipment is associated with the first network node, and determining that the user equipment has a unique access network specific address. In another embodiment, the first network node is a session gateway (SGW) and the step of detecting includes receiving notification from a packet data network gateway (PDN-GW). In a further embodiment, the step of transmitting includes sending a request to a policy charging and rules function (PCRF) to transmit the notification message.

In a second aspect of the present invention, there is provided a local mobility anchor for handling the reset of a first connected network node. The anchor comprises a uswer equipment binding storage, a network interface and a re-attach engine. The user equipment binding storage stores a binding that associates a user equipment with the first connected node. The network interface sends messages to and receives messages from connected nodes. The re-attach engine, responsive to a determination that the first connected node has reset, identifies a user equipment associated with the first connected node through examination of the stored binding, and transmits through the network interface towards a second connected node, a request to instruct the identified user equipment to perform a re-attach procedure.

In an embodiment of the second aspect of the present invention, the binding storage further identifies the user equipment using an access network specific address such as an International Mobile Subscriber Identity (IMSI) or a Mobile Station International Subscriber Directory Number (MSISDN). In a further embodiment, the first and second connected nodes are the same. In another embodiment, the first connected node is a session gateway, and wherein the re-attach engine performs its determination through receipt of a notification from a packet data network gateway (PDN-GW). In a further embodiment, the re-attach engine performs transmission of the request by sending a request to a policy charging and rules function (PCRF) to transmit the notification message.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 1 illustrates an exemplary notification that makes use of IETF mobility option types;

FIG. 2 illustrates an exemplary notification that makes use of Vendor Specific Notify Message Types;

DETAILED DESCRIPTION

Figure 3:
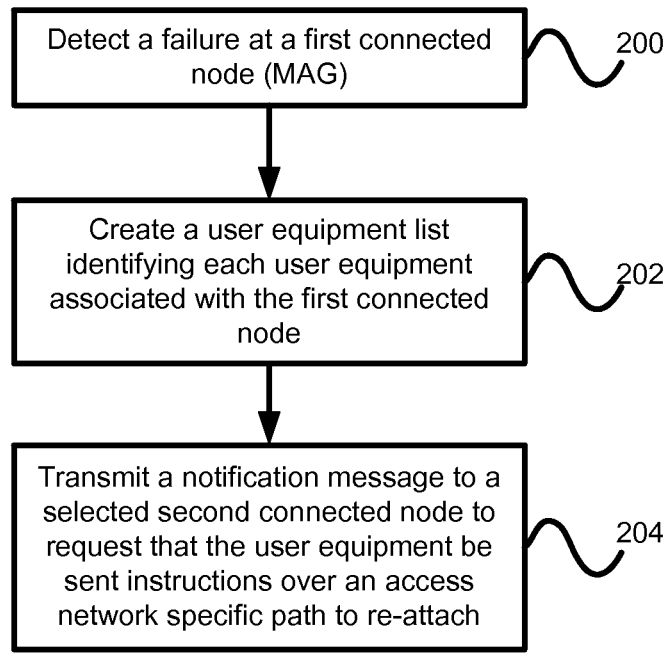
FIG. 3 is a flow chart illustrating an exemplary embodiment of the present invention.

As noted above, the standard handling of a reset for an IPv6 node, such as a Mobile Access Gateway (MAG), is to have the UEs connected to the node re-attach to the MAG. So long as the UE is in communication with the MAG at the time of the reset, it will re-attach and service will be largely uninterrupted. However, if the UE is idle it may have open connections with other services. These other services will be unable to reach the UE at its designated IP address, resulting in communication failures. The below described methods provide a mechanism for obviating and mitigating these failures.

To address the issues identified in the prior art, in some embodiments LMA is left to perform some specific handling once Mobile Access Gateway (MAG) restart is detected. If a MAG restart is detected by the LMA, the LMA preferably will not release all of the corresponding bindings in its cache. The LMA may select an alternative MAG which is servicing the same. Then the LMA can send a mobility message to the selected alternative MAG. The mobility message can be triggered by the restart detection or by the received downlink data on one or more valid binding. The mobility message can contains all UE identifiers that have a valid binding in both the LMA and the restarted MAG.

Upon receiving the mobility message, the selected MAG triggers the access network specific UE notification procedure to notify each UE identified by the message. One example is that in 3GPP access, an IMSI based paging can triggered.

The access network specific UE notification procedure is going to either wake up an idle mode UE to perform re-attachment procedure, or inform the local access network that a handover to the selected MAG shall be performed for the an active UE.

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

In the following discussion there is a plurality of options that are disclosed to address the above identified situation.

FIG. 1 illustrates an exemplary notification 100 for use in one of the options. This illustrated solution makes use of IETF mobility option types. The LMA, upon determining that a first MAG has restarted, will select an alternate MAG (the second MAG). The LMA will then create a list of all UEs for which it has a binding that are associated with the first MAG. In a restoration notification message to the second MAG, the LMA will send a list of all the UE IDs that are associated with the first MAG. The second MAG, upon receiving the exemplary message of FIG. 1, can then extract the UE IDs, and can then begin the network specific UE notification. This notification, as described above, can make use of an identifier other than the IP address (which would necessitate routing through the first MAG), such as the IMSI. Upon receiving instructions to re-attach, the UE will be able to resume its connectivity.

FIG. 2 illustrates an alternate embodiment that can make use of vendor specific restoration notification mobility options as defined in RFC 5094 (Mobile IPv6 Vendor Specific Options). Just as with the message of FIG. 1, the LMA can use the exemplary message 102 format of FIG. 2 to make use of vendor specific instructions, while still providing a list of the UE IDs that are associated with UEs having a binding with both the LMA and the first MAG. The second MAG, upon receipt of the message of FIG. 2 would carry out the same procedure of notification.

FIG. 3 illustrates an exemplary method of notification. At the LMA, detects the reset or failure of a first MAG as shown in step 200. This determination can be made based on detection of heartbeat failures, or through the expiry of the timers discussed above or other methods that will be apparent to those skilled in the art. In step 202, the LMA determines which UEs that it has a binding for are served by the first MAG. These UEs are then identified in a notification message (such as the notification messages of FIGS. 1 and 2). In step 204, the notification message is sent to a second MAG to request that a message be sent to each identified UE instructing the UE to reattach. This message is preferably delivered to the UE over an access network specific path. As noted above, in the context of a 3GPP network, the UE may be identified using an IMSI, which then provides the network specific path. This facilitates the early re-attach of any UE, including those UEs that were previously in an idle state and thus would not have detected the need for a re-attach for a longer period of time.

Figure 4:
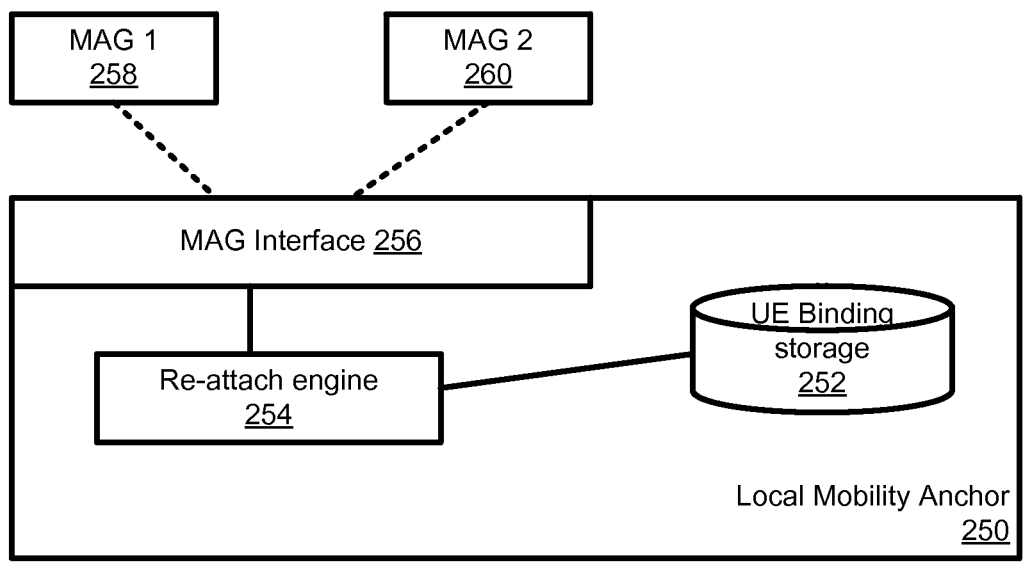
FIG. 4 is a block diagram illustrating a logical configuration of a local mobility anchor.

FIG. 4 illustrates an exemplary Local Mobility Anchor 250. The LMA 250 makes use of storage 252 to maintain a set of UE bindings. The UE bindings will link a UE identifier to a MAG that the UE is connected to. The UE identifier preferably provides an access network specific identifier such as an IMSI or an MSISDN. Re-attach engine 254 monitors, through MAG interface 256, the availability of MAG 1 258 and MAG 2 260. As noted above, this can be done using any of a number of different techniques that will be apparent to those skilled in the art. Upon detecting, that MAG 1 258 is unavailable, reattach engine 254 creates a list, using the bindings in storage 252, of the UEs that are served by MAG 1 258. These UEs are identified and added to a notification message. The notification message is sent, through MAG interface 256 to MAG 2 260. The notification message serves as an instruction to MAG 2 260 to send a re-attach message to the identified UEs. As the UEs are likely not reachable over their IP addresses, the notification can be performed using the access network specific identifiers as described above.

One skilled in the art will appreciate that the Restoration Notification mobility option can be sent in any mobility message. In some implementations, the LMA can send a Binding Error message with Restoration Notification mobility option to the selected MAG.

In other implementations a heartbeat message is sent. This message can be either periodic or aperiodic in nature. The LMA can send the Restoration Notification mobility option in an heartbeat message to the selected MAG.

In a further implementation, the LMA can send a Binding Revocation mobility option message with Restoration Notification mobility option to the selected MAG.

Upon receiving the Binding Revocation mobility option message from the LMA, the MAG can initiate the UE notification procedure. The UE notification procedure can wake up any idle mode UE. Or it can trigger the relocation procedure to handover all attached UE from the restarted MAG to itself.

The MAG can respond to the LMA once the Binding Revocation mobility option message is received. If multiple Binding Revocation mobility option messages are received by the MAG, a conflict mechanism can be employed. Those skilled in the art will appreciate that in some embodiments only the first received message will be handled and the following messages will be ignored.

The LMA will, in a presently preferred embodiment, not send multiple Binding Revocation mobility option messages to the MAG. It can perform the limited number of retransmission if no response message is received from the selected MAG.

The above disclosed embodiments permit flexibility to an LMA restoration procedure at MAG restart condition. This can allow the network (LMA) to reestablish the connections without increasing UE waiting times. This further can allow an operator to limit the service interruption time due to node restart without requiring an impact on the UE.

One skilled in the art will appreciate that the above described method can be utilized for Proxy Mobile IPv6 LMA initiated Session Gateway Restoration. Such a PMIPv6 LMA Initiated SGW restoration procedure can initiated by the node acting as a LMA when a SGW failure is detected by the PDN-GW. This procedure may be applicable for the S5 PMIPv6 interface. The LMA sends a UPN message with a new list of IMSI to the MAG. The fields of the UPN message for the PMIPv6 LMA Initiated SGW restoration procedure can be based on the messages of FIGS. 1 and 2.

In another embodiment, in a 3GPP compliant network, the Packet Gateway or the MME, upon detecting a Session Gateway (SGW) failure with or without restart (relying on restart counter as discussed earlier), can carry out the above described method. Maintaining the Packet Data Network (PDN) connections affected by the SGW failure enables the MME/S4-SGSN to restore the corresponding bearers of the UE by selecting a new SGW or the restarted SGW. The PGW's capability of supporting this SGW restoration procedure is preferably stored per PDN and per UE by the serving MME/S4-SGSN. For a UE with multiple active PDN connections, some PGWs may support the SGW restoration procedure while others do not support the same. E.g. SGW restoration procedure may be supported for a PDN connection with local breakout while not supported for another PDN connection with home routed traffic. It should be noted that the PCRF may be used to issue the notification message on behalf of another node.

In the above discussion, the following acronyms have been employed: IETF: Internet Engineering Task Force; LMA: Local Mobility Agent; MAG: Mobility Access Gateway; and UE: User Equipment.

The following documents are referenced and incorporated herein by reference for their contribution to teaching the existing art: IETF RFC 5213: "Proxy Mobile IPv6"; IETF RFC 5844: "IPv4 Support for Proxy Mobile IPv6"; IETF RFC 5846: "Binding Revocation for IPv6 Mobility"; and IETF RFC 5847: "Heartbeat Mechanism for Proxy Mobile IPv6".

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for handling failure of a first Mobility Access Gateway, the method carried out at a Local Mobility Anchor responsible for a User Equipment associated with the first Mobility Access Gateway, the method comprising:
   detecting a failure of the first Mobility Access Gateway;
   when receiving downlink data for the User Equipment, determining that the User Equipment is served by the first Mobility Access Gateway in failure condition; and
   transmitting a notification message towards a selected second Mobility Access Gateway including instructions to restore the User Equipment connections with the Local Mobility Anchor through the selected second Mobility Access Gateway.

2. The method of claim 1 wherein the step of detecting the failure includes detecting a restart of the network node.

3. The method of claim 1, wherein the User Equipment is identified in the notification message by an access network specific address.

4. The method of claim 3, wherein the access network specific address is an International Mobile Subscriber Identity (IMSI).

5. The method of claim 3, wherein the access network specific address is a Mobile Station International Subscriber Directory Number (MSISDN).

6. The method of claim 1, wherein the step of transmitting comprises sending a request to a policy charging and rules function (PCRF) instructing the PCRF to transmit the notification message to the selected second Mobility Access Gateway.

7. A Local Mobility Anchor for handling failure of a first Mobility Access Gateway, the Local Mobility Anchor comprising:
   a User Equipment binding storage for storing a binding that associates a User Equipment with the first Mobility Access Gateway;
   a network interface for sending messages to and receiving messages from Mobility Access Gateways; and
   a re-attach engine for, detecting failure of the first Mobility Access Gateway and when receiving downlink data for the User Equipment, identifying the User Equipment is associated with the first Mobility Access Gateway through examination of the stored binding,
   determining that the first Mobility Access Gateway is failed, and, transmitting through the network interface towards a selected second Mobility Access Gateway a notification message instructing the selected second Mobility Access Gateway to restore the User Equipment connections with the Local Mobility Anchor.

8. The Local Mobility Anchor of claim 7, wherein the User Equipment is identified in the notification message by an access network specific address.

9. The local mobility anchor of claim 8, wherein the access network specific address is an International Mobile Subscriber Identity (IMSI).

10. The local mobility anchor of claim 8, wherein the access network specific address is a Mobile Station International Subscriber Directory Number (MSISDN).

11. The Local Mobility Anchor of claim 7, wherein the re-attach engine performs transmission of the notification message by sending a request to a policy charging and rules function (PCRF) instructing the PCRF to transmit the notification message to the selected second Mobility Access Gateway on behalf of the Local Mobility Anchor.

12. The method of claim 1, wherein the step of transmitting the notification message towards the selected second Mobility Access Gateway is sent following detecting the failure of the first Mobility Access Gateway, and the notification message comprises access network specific addresses of one or more Users Equipments connected to the first Mobility Access Gateway.

13. The Local Mobility Anchor of claim 7, wherein the step of transmitting, through the network interface, the notification message towards the selected second Mobility Access Gateway is sent following detecting the failure of the first Mobility Access Gateway, and the notification message comprises access network specific addresses of one or more Users Equipments connected to the first Mobility Access Gateway.

* * * * *